(12) United States Patent
Kelkka et al.

(10) Patent No.: US 8,340,728 B2
(45) Date of Patent: Dec. 25, 2012

(54) INCOMING CALL INDICATION IN A MOBILE TELECOMMUNICATION SYSTEM

(75) Inventors: Pekka Kelkka, Helsinki (FI); Pekka Ettala, Helsinki (FI); Ville Ettala, Helsinki (FI)

(73) Assignee: Madtag Oy, Helsinki (FI)

( * ) Notice: Subject to any disclaimer, the term of this patent is extended or adjusted under 35 U.S.C. 154(b) by 335 days.

(21) Appl. No.: 12/739,684

(22) PCT Filed: Oct. 23, 2008

(86) PCT No.: PCT/FI2008/050594
§ 371 (c)(1),
(2), (4) Date: Apr. 23, 2010

(87) PCT Pub. No.: WO2009/053532
PCT Pub. Date: Apr. 30, 2009

(65) Prior Publication Data
US 2011/0028187 A1  Feb. 3, 2011

(30) Foreign Application Priority Data
Oct. 24, 2007  (EP) .................................... 07020802

(51) Int. Cl.
*H04M 1/00* (2006.01)
*H04B 1/38* (2006.01)
(52) U.S. Cl. ................. 455/567; 455/550.1; 379/142.17; 379/88.21
(58) Field of Classification Search .... 379/88.19–88.21, 379/142.17, 142.01, 201.11; 455/566–567, 455/550.1
See application file for complete search history.

(56) References Cited

U.S. PATENT DOCUMENTS

| | | | | |
|---|---|---|---|---|
| 7,599,482 | B2 * | 10/2009 | Silver et al. | 379/373.02 |
| 7,995,728 | B1 * | 8/2011 | Martin et al. | 379/201.02 |
| 2007/0192067 | A1 | 8/2007 | Wong et al. | |
| 2007/0206733 | A1 | 9/2007 | Bennett | |

FOREIGN PATENT DOCUMENTS

| WO | WO 02/17602 A1 | 2/2002 |
|---|---|---|
| WO | WO 03/030502 A1 | 4/2003 |
| WO | WO 2006/084451 A1 | 8/2006 |
| WO | WO 2007/006654 A1 | 1/2007 |
| WO | WO 2007/098508 A1 | 8/2007 |

* cited by examiner

*Primary Examiner* — Christian Hannon
(74) *Attorney, Agent, or Firm* — Birch, Stewart, Kolasch & Birch, LLP

(57) ABSTRACT

Incoming call indication method and system in a call initialization process in a mobile telecommunication system, whereby a user (caller, USER1) having a calling mobile telecommunication terminal device (MOBILE1) makes a call to another user (recipient, USER2)) having a called mobile telecommunication terminal device (MOBILE2), in which the call initialization process the calling user dials or selects the called user's telephone number and the calling mobile phone contacts the called mobile phone according to the mobile telecommunication system protocol and preferably alarms (alerts) the called mobile phone for an incoming call, and wherein the calling user's ID, preferably the phone number, is transmitted to the called mobile phone, and wherein media, such as a tag, specified by the calling user (USER1) is steered to and displayed and/or otherwise processed in the called mobile telecommunication terminal device at least during the call initialization process.

21 Claims, 2 Drawing Sheets

INCOMING CALL INDICATION IN A MOBILE TELECOMMUNICATION SYSTEM

FIELD OF THE INVENTION

The present invention relates to incoming call indication in a mobile telecommunication system.

Especially the present invention relates to incoming call indication in a call initialization process in a mobile telecommunication, whereby a user (caller) having a calling mobile phone makes a call to another user (recipient) having a called mobile phone.

In the call initialization process the calling user dials or selects the called user's telephone number, the calling mobile phone contacts the called mobile phone according to the mobile telecommunication system protocol and alarms (alerts) the called mobile phone. The calling user's ID, preferably the phone number, is transmitted to the called mobile phone.

Naturally instead a mobile phone any other mobile telecommunication terminal device operable in that mobile telecommunication system may be used.

BACKGROUND OF THE INVENTION

A ringtone is an electric telephony signal that conventionally causes a mobile phone to alert the user to an incoming call.

It has been showed that people would wait until the phone stopped ringing before picking it up. Breaks were thus introduced into the signal to avoid this problem, resulting in the common ring-pause-ring cadence pattern used today. Caller ID signals identifying the caller are sent during the silent interval between the first and second bursts of the ringing signals.

Mobile phones allow the users to associate different ringtones for different phone book entries. Websites let users make ringtones from the music they already own (MP3, CD etc.) and upload directly to their mobile phone. In addition to the cost benefits, a key feature is the music editor that lets the user easily pick the part of the song they wish to set as a ringtone. Such services automatically detect the phone settings to ensure the best file type and format.

An alternative to a ring tone for mobile phones is a vibrating alert. It may be useful in noisy environments, in places where ring tone noise would be disturbing and for those with a hearing loss.

US2007192067 discloses an apparatus for automatically selecting alert option of a communication device is provided. The apparatus includes a noise detection unit for collecting a current ambient noise, and generating a quantified value of the current ambient noise according to the current ambient noise collected; and a central processing unit (CPU), including a detecting module for detecting the communication signal from the receiver, enabling the noise detection unit to perform the corresponding function, and determining a volume level of the current ambient noise according to the quantified value of the current ambient noise from the noise detection unit; and a controlling module for selecting a current alert option of the communication device according to the volume level of the current ambient noise, and controlling the ringing unit and the vibrating unit of the communication device to perform corresponding functions according to the alert option selected.

Typical for the prior art incoming call indication systems are that incoming call indication type is defined only by the recipient, naturally within the limits of the user's mobile phone capabilities.

SUMMARY OF THE INVENTION

The object of the present invention is to overcome the problems and limitations with the existing incoming call indication methods and systems.

The present invention is based on an idea that instead of the called user the caller (calling user) specifies how the incoming call is indicated in the recipient's phone and what kind of media is steered to and displayed in the recipient's mobile phone during the call initialization process.

This is implemented so that the caller by using a mobile phone incoming call media application, so called MadTag application, steers a desired media, such as a tag, e.g. from his MadTag www-site, to the recipient's mobile phone so that when this specific caller calls the recipient a caller specific tag is steered to the recipient's mobile phone and displayed therein.

In a preferred embodiment the application starts immediately and automatically after the connection is created. e.g. within some seconds from the time when the call connection is ready.

The present invention is in detail defined in the enclosed claims, especially in the independent method and system claims.

By means of the present invention it is possible that, on the contrary to the conventional systems, the caller defines which indication the recipient gets of an incoming call. This gives a totally new way of communication and especially dialing indication possibilities.

Many kind of mobile telecommunication systems and terminal devices, such as communicators etc, having 3G, GPRS or corresponding properties may be used in the present invention.

BRIEF DESCRIPTION OF THE FIGURES

In the following, preferred embodiments of the present invention will be described in detail by reference to the enclosed drawings, wherein.

DETAILED DESCRIPTION OF PREFERRED EMBODIMENTS

Figure 1:
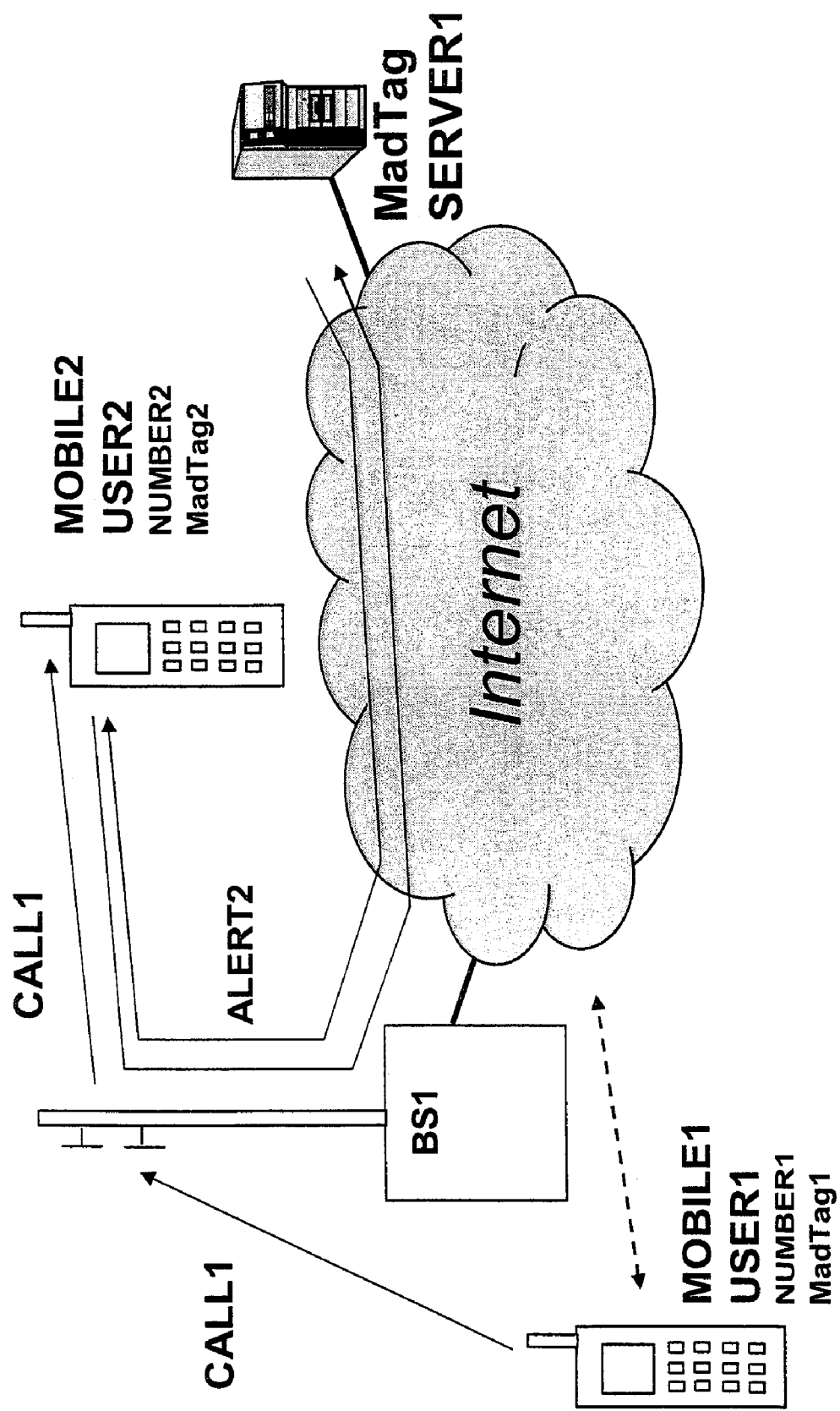
FIG. 1 presents a schematical view of a 3G mobile telecommunication system.

FIG. 1 presents of a 3G mobile telecommunication system operating with a 3G protocol and comprising users having 3G mobile phones, here for simplification only two, USER1 with MOBILE1 and USER2 with MOBILE2 who are in communication with each other via the 3G network having base stations, here for simplification only one BS1. All users in a 3G network having a 3G mobile phone have access to Internet and may use the Internet and its services provided for 3G networks.

Each phone is a 3G mobile phone provided with corresponding processor and memory capacity and further provided in this embodiment with an Symbian Operative System which is a proprietary operating system, designed for mobile devices, with associated libraries, user interface frameworks and reference implementations of common tools, produced by Symbian Ltd. It runs exclusively on ARM processors.

A calling user USER1 makes a telephone call CALL1 to another client USER2 with his mobile phone MOBILE1 by dialing the recipient's telephone number NUMBER2 or selecting it from the telephone book. The called (receiving) mobile phone MOBILE2 alerts for incoming call with a ringtone and a tag ALERT2 which may be text, images, video clips and their combinations, based on the caller's telephone number NUMBER1 which is transmitted to the recipient according to the present invention as in detail described later.

Each phone utilizing the present invention is provided with a MadTag application MadTag1, MadTag2 operating as a client software application the operation and structure of which is described in the following in further detail.

The called user gets the tag alerting of an incoming call by using the incoming call media application, so called MadTag application MadTag2, which steers a desired tag ALERT2 from the caller's MadTag www-site stored in Internet in the www-server SERVER1 to the recipient's mobile phone so that when this specific user USER1 calls the recipient USER2 the desired incoming call tag is steered to this specific recipient's mobile phone and displayed therein. Thus the request from MOBILE2 is steered via the base station BS1 and Internet to the MadTag server SERVER1 and the tag is then steered from SERVER1 via Internet and base station BS1 to the recipient's mobile phone MOBILE2. The total time for sending the request until the tag is displayed is typically 2 to 3 s. The provision for the operation is that both users are member of a same MadTag user group (community).

MadTag is a Symbian software application operating in the 3G layer embedded in the dialing procedure which starts automatically in the calling phone MOBILE1 when the caller calls a user within this MadTag application community, and in the called phone when the user receives a call from a user within this MadTag application community.

MadTag application tag is typically displayed in the recipient's phone only during the call initialization process and thus stops when the recipient answers to the call.

Madtag—Principal Operation

1. Client www Registration
   upon registration the user gets a link that he writes/dials into the mobile phone
   http link is stored in the phone
   the Madtag application is fetched from the server
   a downloading software is installed in the phone
   the software inquires if the application shall be downloaded
   if yes
   then the Madtag application may be used in that mobile phone 2. Adding Madtag Users to the Profile
   the user gets a Madtag folder from the server where the client stores contents (tags) which is addressed according to a name and mobile phone number to include friends in the client's Madtag community
   if the client wants these friends to his community he sends to them an email from a site having the www site link.

Figure 2:
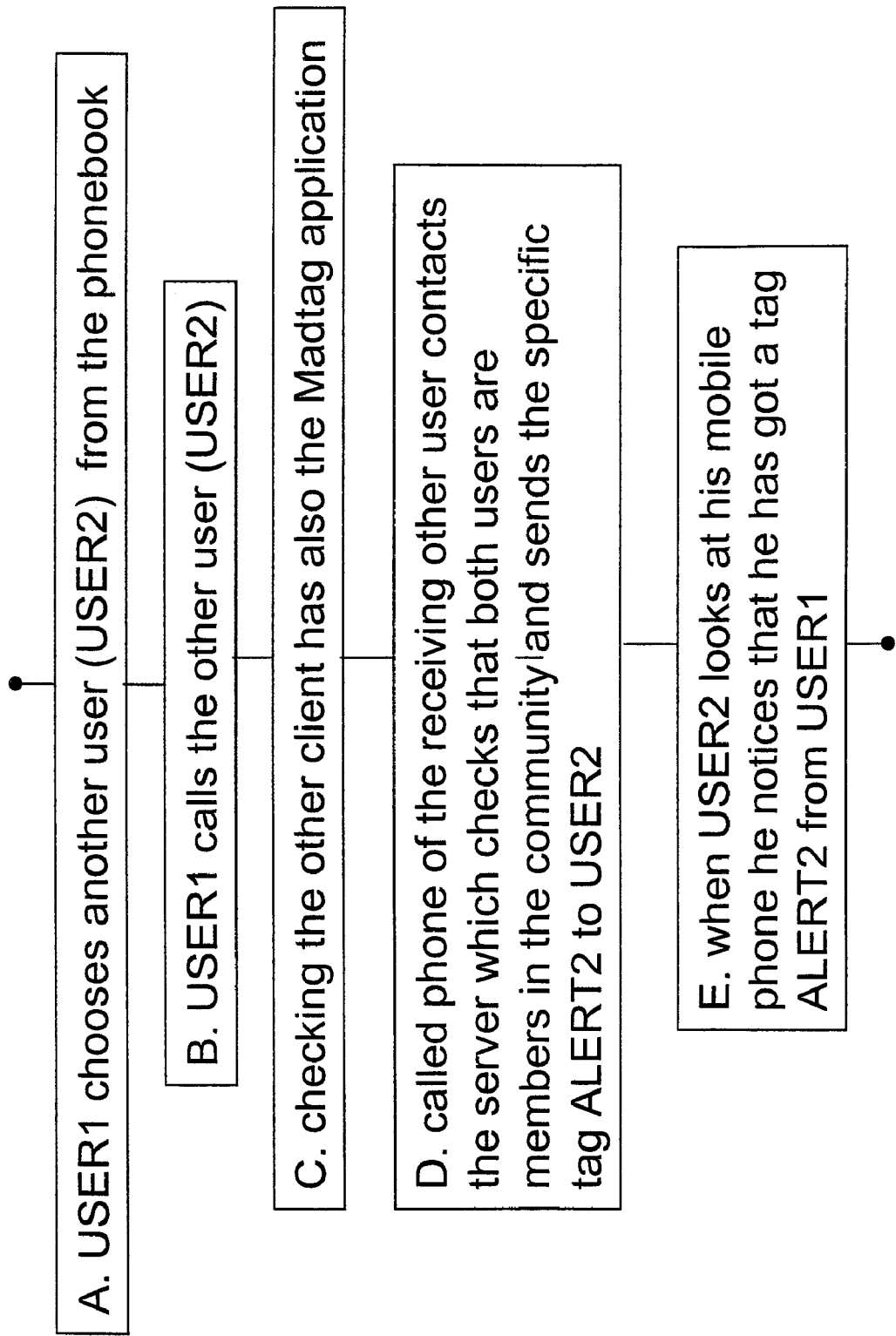
FIG. 2 presents a block diagram of the operation of incoming call indication according to the present invention.

3. Madtag Process (see Block Diagram in FIG. 2)
   the user (USER1) chooses another user (USER2) from the phonebook (A),
   the user (USER1) calls the other user (USER2) so that the mobile phone dials the other user's number (B),
   in the receiving other user having also the Madtag application in his phone the called phone gets an alert (e.g. a ringtone) and starts the MadTag application immediately (in some ms) after the first ringtone or other alert for incoming call (C),
   the called phone contacts the server (SERVER1) and SERVER1 checks that both users are members in the same community and informs that USER1 has a Madtag tag for USER2 and sends it to USER2 (D) (see also FIG. 1),
   when USER2 looks at his mobile phone he notices that he has got a tag ALERT2 from USER1 displayed in the display of his called phone (E), typically in some seconds from the first alert (see also FIG. 1).

Application Modules

1—Server Data Base
   The server data base will be MySql 5.x data base that will hold and maintain and manage all data used by the system. It will provide security level DB to the contained data.

2—Back Ground Symbian Application ($3^{rd}$ Symbian SDKs)
   The back ground Symbian application will be installed with the interface application on the same setup file. After installation the background application will be disabled until registration is done. After that it is enabled and running all the time until the end-user disables it from the settings in the interface application. If the mobile is restarted the application will start with it. The application will do the following tasks.
   a) Monitoring for any incoming call.
   b) If call comes, the application catches the calling mobile number and queries the server about it.
   c) When the response arrives, it save it to a log database or file and show the result on the screen. The name of the caller and image are the only shown info while call is received, the rest of the data (example phone numbers) can be viewed using the interface application.

3—Interface Symbian Application ($3^{rd}$ Symbian SDKs)
   This is the application that the user sees on his mobile. It enables him to control the work of the other application and view recent calls and to edit his own data. The application will be installed on the user mobile and after installation it will appear as an Icon and a Name in the installed applications place in the phone menu. When the user selects the application to run the following screens may appear.
   a) Splash Screen
      It will be shown in the beginning of the program only for 2→3 seconds. It personalizes the program and to give a chance for initialization data to be loaded without appearing delay.
   b) Main Screen
      The screen is the first screen to show after the splash disappears. The screen also will have menu options (Options—Exit). The options part of the menu will have the following submenu.
         i—Register: This will be shown only at first until the user performs registration. When executed it will ask the user for registration code and contacts the server with entered code and mobile IMEI to perform the registration. If the process succeeded, an info message will tell the user that the registration success and the item will not appear again.
         ii—Settings: to enable user to edit the settings from the settings screen.
         iii—Help: For viewing the help part of this screen.
         iv—Exit: to exit the interface program c) User Info (WWW)
   The Symbian application will not provide an interface for adding numbers, this will be done via the WWW pages, which allows the user to easily manage many contacts.
   The program should include a search function to search by name from the MadTag list name or names matching the search query. The text part of the selected name can then be edited and saved.
d) Settings Screen
   This screen will enable the user to control the working of the background and interface application. The screen will display a list with the various settings and the user selects what he wants to change. The menu of this screen will be in the form of (options—Back). The menu will contain the following submenu
   i—Change: to change the current setting value.
      a. Options like activate/deactivate background service
   ii—Help: to view help file for this screen.
   iii—Exit: to exit interface application.
Operation of Madtag in More Detail
The application operates as follows.
The application in hand is a Symbian application aims to do the following
   1—To be installed on mobile phones that support 3G, GPRS & compatible with e.g. Symbian $3^{rd}$ edition. The owner of the mobile that the application is installed on is referred to as the end-user.
   2—After installation the end-user should register his/her version of the application to be able to use it. Registration is free and done by entering a given code acquired from a web site. The code entered can't be used again with any other registration because it is attached to mobile IMEI.
   3—The end-user will have settings in the installed application that enable him to control the behavior of the installed application.
   4—The application starts automatically in the background to catch an incoming call. This feature can be cancelled by enable/disable setting in the settings screen.
   5—When the application is installed and enabled, and a call is received, the application queries the server (through 3G or GPRS) for the owner of the caller mobile number, and if found it displays his/her information to the end-user, the information may be both text and a small image (if available). After the call ends a customized advertisement or a graphical business card supplied by MadTag is shown to the recipient's device (if available). If the caller number is not found then no indication is made. The caller also has the ability to control if the data to be shown at call received or not by another setting (Show caller info immediately Yes/No).
   6—The end-user can update his own information on the server using the application (Text only) from his mobile phone that has access to internet (see the dashed line in FIG. 1) or a laptop or alike by using an updating software and its user interface. And he can edit his image and Customized add from a dedicated web site.
Task for Admin www-Site Interface
The admin will be able to add sponsors of competitions. And by default the first sponsor will be the Madtag portal itself otherwise administrator will be able to mange sponsors.
There will be a calendar, (with start and end dates), which is categorized by day and by time, that regulates the duration of each advert.

On the web user inter face there will be advertising spots, banners, links and click counter, and the admin will have full control over them.

Also a wild card search will be available.

It is obvious to the person skilled in the art that the embodiments of the invention are not restricted to the example presented above, but that they can be varied within the scope of the following claims. The tag can be stored in addition to a www site in a www server also in the caller's mobile phone (intern memory) or in TV or elsewhere in an appropriate external memory device. Steering of media from the memory to the user's mobile phone can be implemented either by pulling or pushing. The Madtag application can also be controlled with a timer so that it operates a certain time, typically some seconds, also after the initialization process.

The mobile telecommunication system may be a 3G network i.e. third generation of mobile phone standards and technology providing wide area cellular telephone networks which evolved to incorporate Internet access and video telephony, or a General Packet Radio Service (GPRS) network providing Mobile Data Service available to users of Global System for Mobile Communications (GSM) and IS-136 mobile phones or any other mobile telecommunication system having high rate data transmission e.g. capable of having access to Internet.

The invention claimed is:

1. An incoming call indication method in a call initialization process in a mobile telecommunication system, whereby a calling user having a calling mobile telecommunication terminal device (MOBILE 1) makes a call to a called user having a called mobile telecommunication terminal device (MOBILE 2), the method comprising:
   during the call initialization process, the calling user causing the calling mobile device (MOBILE 1) to dial or select a telephone number of the called mobile device (MOBILE 2) used by the called user,
   the calling mobile device (MOBILE 1) contacting the called mobile device (MOBILE 2) according to a mobile telecommunication system protocol and sending an incoming call alert to the called mobile device (MOBILE 2),
   transmitting an ID of the calling mobile device (MOBILE 1 to the called mobile device (MOBILE 2), and
   steering media by the calling user to the called mobile device (MOBILE 2),
   using a media application for displaying and processing the received media in the called mobile device (MOBILE 2) at least during a part of the call initialization process,
   the method further comprising:
   holding, maintaining and managing all data used by the method in a Server Data Base,
   continuously running a background application in both of the calling and called mobile devices (MOBILE 1, MOBILE 2) until the respective user disables it from settings in an interface application,
   the interface application on each of the calling and called mobile devices (MOBILE 1, MOBILE 2) enabling the calling user to control work of the application and view recent calls and to edit data associated with the calling mobile device (MOBILE 1), and
   enabling the called user to control work of each of the applications, to view recent calls, and to edit data associated with the called mobile device (MOBILE 2).

2. The method according to claim 1,
   wherein the media application starting automatically starts the displaying and processing the media in the called mobile device (MOBILE 2) after the called mobile device (MOBILE 2) receives the incoming call alert, or after a call connection is completed.

3. The method according to claim 1, wherein in addition to sending the incoming call alert to the called mobile phone device (MOBILE 2), the media application also displays processes the media on the called mobile phone device (MOBILE 2).

4. The method according to claim 1,
wherein the media is text, an image, a video clip, or a sound, or a combination of at least two of the text, the image, the video clip, and the sound.

5. The method according to claim 1, the media is stored in external storage means.

6. The method according to claim 1,
wherein the media application in the called mobile device (MOBILE 2) is adapted to check client information from a media server (SERVER 1), based on at least an International Mobile Equipment Identity (IMEI) or telephone number of the calling mobile device (MOBILE 1), and
when the client information matches, the media from the media server (SERVER 1) is adapted to be steered to the called mobile device (MOBILE 2).

7. The method according to claim 1,
wherein the media is only displayed and processed a certain time after the initialization process.

8. The method according to claim 1,
wherein the media is also displayed and processed a certain time after the initialization process.

9. The method according to claim 1,
wherein after the call initialization process has ended, a customized advertisement or a graphical business card is displayed in the called mobile device (MOBILE 2).

10. An incoming call indication system in a call initialization process in a mobile telecommunication system, whereby a calling user having a calling mobile telecommunication terminal device (MOBILE 1) is capable of making a call to called user having a called mobile telecommunication terminal device (MOBILE 2),
in which the call initialization process, the calling user causes the calling mobile device (MOBILE 1) to dial or select a telephone number of the called mobile device (MOBILE 2) used by the called user, and the calling mobile device (MOBILE 1) contacts the called mobile device (MOBILE 2) according to a mobile telecommunication system protocol, and sends an incoming call alert to the called mobile device (MOBILE 2), and
wherein an ID of the calling mobile device (MOBILE 1) is transmitted to the called mobile device (MOBILE 2),
wherein the system comprises:
means adapted so that media specified by the calling user is steered to and displayed and processed in the called mobile device (MOBILE 2) at least during a part of the call initialization process,
a media application capable of operating at least in the called mobile device (MOBILE 2), displaying and processing the received media in the called mobile device (MOBILE 2),
a Server Data Base holds, maintains and manages all data used by the system,
a background application enabled and capable of running continuously in both of the calling and called mobile devices (MOBILE 1, MOBILE 2) until the respective user disables it from settings in an interface application,
the interface application on each of the calling and called mobile devices (MOBILE 1, MOBILE 2) enabling the calling user to control work of the application and view recent calls and to edit data associated with the calling mobile device (MOBILE 1), and
enabling the called user to control work of each of the applications, to view recent calls, and to edit data associated with the called mobile device (MOBILE 2).

11. The system according to claim 10, wherein
the application is adapted to automatically start the displaying and processing the media in the called mobile device (MOBILE 2) after the called mobile device (MOBILE 2) receives the incoming call alert, or after a call connection is completed.

12. The system according to claim 10, wherein in addition to sending the incoming call alert to the called mobile phone device (MOBILE 2), the media application is also adapted to display and process the media on the called mobile phone device (MOBILE 2).

13. The system according to claim 10, wherein the media is text, an image, a video clip, or a sound, or a combination of at least two of the text, the image, the video clip, and the sound.

14. The system according to claim 10, wherein the media application in the called mobile device (MOBILE 2) is adapted to check client information from a media server (SERVER 1), based on at least an International Mobile Equipment Identity (IMEI) or telephone number of the calling mobile device (MOBILE 1), and
when the client information matches, the media from the media server (SERVER 1) is adapted to be steered to the called mobile device (MOBILE 2).

15. The system according to claim 10, wherein the media is only adapted to be displayed and processed during the call initialization process.

16. The system according to claim 10, wherein the media is also displayed and processed a certain time after the initialization process.

17. The system according to claim 10, wherein the media is a tag.

18. The system according to claim 10, wherein after the call initialization process has ended, a customized advertisement or a graphical business card is adapted to be displayed in the called mobile device (MOBILE 2).

19. The system according to claim 10, the media is stored in the calling mobile device (MOBILE 1).

20. The system according to claim 10, wherein the media is stored in external storage means provided with suitable memory.

21. The system according to claim 10, wherein the calling user can update information stored in a media storage means using an updating application from the calling mobile device (MOBILE 1) by using a user interface of the updating application.

* * * * *